United States Patent
Rippel et al.

(10) Patent No.: US 10,402,722 B2
(45) Date of Patent: Sep. 3, 2019

(54) ADAPTIVE COMPRESSION BASED ON CONTENT

(71) Applicant: WaveOne Inc., Mountain View, CA (US)

(72) Inventors: Oren Rippel, Mountain View, CA (US); Lubomir Bourdev, Mountain View, CA (US); Carissa Lew, San Jose, CA (US); Sanjay Nair, Fremont, CA (US)

(73) Assignee: WaveOne Inc., Mountain View, CA (US)

( * ) Notice: Subject to any disclaimer, the term of this patent is extended or adjusted under 35 U.S.C. 154(b) by 69 days.

(21) Appl. No.: 15/844,424

(22) Filed: Dec. 15, 2017

(65) Prior Publication Data
US 2018/0176578 A1    Jun. 21, 2018

Related U.S. Application Data

(60) Provisional application No. 62/458,749, filed on Feb. 14, 2017, provisional application No. 62/434,602, (Continued)

(51) Int. Cl.
*H04N 19/167* (2014.01)
*H04N 19/126* (2014.01)
(Continued)

(52) U.S. Cl.
CPC ............ *G06N 3/08* (2013.01); *G06K 9/00288* (2013.01); *G06K 9/00744* (2013.01); (Continued)

(58) Field of Classification Search
CPC ............ G06N 3/08; G06N 20/00; G06N 3/04; G06N 3/084; H04N 19/126; H04N 19/13; (Continued)

(56) References Cited

U.S. PATENT DOCUMENTS

| 6,424,737 B1 * | 7/2002 | Rising, III | G06T 9/002 375/E7.04 |
| 2011/0091107 A1 * | 4/2011 | Sugihara | H04N 19/17 382/173 |
| 2015/0016510 A1 * | 1/2015 | Carlsson | H04N 19/15 375/240.03 |
| 2017/0264902 A1 * | 9/2017 | Ye | H04N 19/124 |

OTHER PUBLICATIONS

Duan et al, "A Natural Image Compression Approach Based on Independent Component Analysis and Visual Saliency Detection", 2012, Adv. Sci. Lett. vol. 5, No. xx, 4 pages (Year: 2012).*
(Continued)

*Primary Examiner* — David F Dunphy
(74) *Attorney, Agent, or Firm* — Fenwick & West LLP

(57) ABSTRACT

A compression system trains a machine-learned encoder and decoder. The encoder can be deployed by a sender system to encode content for transmission to a receiver system, and the decoder can be deployed by the receiver system to decode the encoded content and reconstruct the original content. The encoder receives content and generates a tensor as a compact representation of the content. The content may be, for example, images, videos, or text. The decoder receives a tensor and generates a reconstructed version of the content. In one embodiment, the compression system trains one or more encoding components such that the encoder can adaptively encode different degrees of information for regions in the content that are associated with characteristic objects, such as human faces, texts, or buildings.

27 Claims, 9 Drawing Sheets

Related U.S. Application Data filed on Dec. 15, 2016, provisional application No. 62/434,603, filed on Dec. 15, 2016, provisional application No. 62/434,600, filed on Dec. 15, 2016.

(51) Int. Cl.

| | |
|---|---|
| *H04N 19/172* | (2014.01) |
| *H04N 19/196* | (2014.01) |
| *H04N 19/91* | (2014.01) |
| *G06N 3/08* | (2006.01) |
| *G06K 9/62* | (2006.01) |
| *G06K 9/00* | (2006.01) |
| *G06N 3/04* | (2006.01) |
| *G06N 20/00* | (2019.01) |
| *H04N 19/44* | (2014.01) |
| *G06K 9/66* | (2006.01) |
| *G06T 5/00* | (2006.01) |
| *H04N 19/13* | (2014.01) |
| *H04N 19/149* | (2014.01) |
| *H04N 19/18* | (2014.01) |
| *H04N 19/48* | (2014.01) |
| *H04N 19/154* | (2014.01) |
| *H04N 19/33* | (2014.01) |
| *G06K 9/46* | (2006.01) |

(52) U.S. Cl.
CPC ....... *G06K 9/00771* (2013.01); *G06K 9/4619* (2013.01); *G06K 9/4628* (2013.01); *G06K 9/6212* (2013.01); *G06K 9/6232* (2013.01); *G06K 9/6256* (2013.01); *G06K 9/6263* (2013.01); *G06K 9/6274* (2013.01); *G06K 9/66* (2013.01); *G06N 3/04* (2013.01); *G06N 3/084* (2013.01); *G06N 20/00* (2019.01); *G06T 5/002* (2013.01); *H04N 19/126* (2014.11); *H04N 19/13* (2014.11); *H04N 19/149* (2014.11); *H04N 19/154* (2014.11); *H04N 19/167* (2014.11); *H04N 19/172* (2014.11); *H04N 19/18* (2014.11); *H04N 19/197* (2014.11); *H04N 19/33* (2014.11); *H04N 19/44* (2014.11); *H04N 19/48* (2014.11); *H04N 19/91* (2014.11); *G06K 2209/01* (2013.01)

(58) Field of Classification Search
CPC .. H04N 19/149; H04N 19/154; H04N 19/167; H04N 19/172; H04N 19/18; H04N 19/197; H04N 19/33; H04N 19/44; H04N 19/48; H04N 19/91; G06K 9/00288; G06K 9/00744; G06K 9/00771; G06K 9/4619; G06K 9/4628; G06K 9/6212; G06K 9/6232; G06K 9/6256; G06K 9/6263; G06K 9/6274; G06K 9/66; G06T 5/002

See application file for complete search history.

(56) References Cited

OTHER PUBLICATIONS

Guo et al, "A Novel Multiresolution Spatiotemporal Saliency Detection Model and Its Applications in Image and Video Compression", 2010, IEEE Transactions on Image Processing, vol. 19, No. 1, 14 pages (Year: 2010).*

Khanna et al, "Perceptual Depth Preserving Saliency based Image Compression", 2015, PerMin '15,6 pages (Year: 2015).*

Lee et al, "Non-uniform Image Compression using Biologically Motivated Saliency Map Model", 2004, ISSNIP, 6 pages (Year: 2004).*

Zünd et al, "Content-Aware Compression Using Saliency-Driven Image Retargeting", 2013, ICIP, 5 pages (Year: 2013).*

Antonini, M. et al., "Image Coding Using Wavelet Transform," IEEE Transactions on Image Processing, Apr. 1992, pp. 205-220, vol. 1, No. 2.

Balle, J. et al., "End-to-End Optimized Image Compression," ICLR 2017, Mar. 3, 2017, pp. 1-27.

Balle, J. et al., "Variational Image Compression with a Scale Hyperprior," ICLR 2018, May 1, 2018, pp. 1-23.

Bottou, L. et al., "High Quality Document Image Compression with "DjVu"," Journal of Electronic Imaging, Jul. 1998, pp. 410-4258, vol. 7, No. 3.

Dang-Nguyen, D.-T. et al., "Raise: A Raw Images Dataset for Digital Image Forensics," In Proceedings of the 6th ACM Multimedia Systems Conference, ACM, 2015, MMSys'15, Mar. 18-20, 2015, pp. 219-224.

Denton, E. L. et al., "Deep Generative Image Models Using a Laplacian Pyramid of Adversarial Networks," In Advances in Neural Information Processing Systems, Jun. 18, 2015, pp. 1486-1494.

Goodfellow, I. et al., "Generative Adversarial Nets." In Advances in Neural Information Processing Systems, 2014, pp. 2672-2680.

Haffner, P. et al., "DjVu: Analyzing and Compressing Scanned Documents for Internet Distribution," ICDAR 1999, 1999, pp. 1-4.

Hinton, G.E. et al., "Reducing the Dimensionality of Data with Neural Networks," Science, Jul. 28, 2006, pp. 504-507, vol. 313.

Isola, P. et al., "Image-to-Image Translation with Conditional Adversarial Networks," Nov. 22, 2017, pp. 1-17.

Kingma, D. et al., "Adam: A Method for Stochastic Optimization," ICLR 2015, Jan. 30, 2017, pp. 1-15.

Ledig, C. et al., "Photo-Realistic Single Image Super-Resolution Using a Generative Adversarial Network," Nov. 21, 2016, pp. 1-19.

Mallat, S. G. "A Theory for Multiresolution Signal Decomposition: The Wavelet Representation," IEEE Transactions on Pattern Analysis and Machine Intelligence, Jul. 1989, pp. 674-693, vol. 11, No. 7.

Mathieu, M. et al., "Deep Multi-Scale Video Prediction Beyond Mean Square Error," ICLR 2016, Feb. 26, 2016, pp. 1-14.

Radford, A. et al., "Unsupervised Representation Learning with Deep Convolutional Generative Adversarial Networks," ICLR 2016, Jan. 7, 2016, pp. 1-16.

Rippel, O. et al., "Learning Ordered Representations with Nested Dropout," In International Conference on Machine Learning, Feb. 5, 2014, 11 pages.

Salimans, T. et al., "Improved Techniques for Training GANs," 30th Conference on Neural Information Processing Systems (NIPS 2016), Barcelona, Spain, In Advances in Neural Information Processing Systems, 2016, pp. 2226-2234.

Santurkar, S. et al., "Generative Compression," Jun. 4, 2017, pp. 1-10.

Shi,W. et al., "Real-Time Single Image and Video Super-Resolution Using an Efficient Sub-Pixel Convolutional Neural Network," the IEEE Conference on Computer Vision and Pattern Recognition (CVPR), 2016, pp. 1874-1883.

Theis, L. et al., "Lossy Image Compression with Compressive Autoencoders," ICLR 2017, Mar. 1, 2017, pp. 1-19.

Thomee, B. et al., "YFCC100M: The New Data in Multimedia Research," Communications of the ACM, Feb. 2016, pp. 64-73, vol. 59, No. 2.

Toderici, G. et al., "Full Resolution Image Compression with Recurrent Neural Networks," ICLR 2017, Jul. 7, 2017, pp. 1-9.

Toderici, G. et al., "Variable Rate Image Compression with Recurrent Neural Networks," ICLR 2016, pp. 1-12.

Wallace, G.K., "The JPEG Still Picture Compression Standard," IEEE Transactions on Consumer Electronics, Feb. 1992, pp. xviii-xxxiv, vol. 38, No. 1.

Wang, Z. et al., "Image Quality Assessment: from Error Visibility to Structural Similarity," IEEE Transactions on Image Processing, Apr. 2004, pp. 600-612, vol. 13, No. 4.

(56) References Cited

OTHER PUBLICATIONS

Wang, Z. et al., "Multiscale Structural Similarity for Image Quality Assessment," In Conference Record of the Thirty-Seventh Asilomar Conference on Signals, Systems and Computers, 2004., IEEE, Nov. 9-12, 2003, pp. 1398-1402, vol. 2.

Wikipedia: Structural Similarity, Wikipedia.org, Last Edited Mar. 22, 2018, 7 pages, [Online] [Retrieved on Apr. 10, 2018] Retrieved from the Internet<URL:https://en.wikipedia.org/wiki/Structural_similarity>.

* cited by examiner

ADAPTIVE COMPRESSION BASED ON CONTENT

CROSS REFERENCE TO RELATED APPLICATIONS

This application claims the benefit of provisional U.S. Application No. 62/434,600, filed on Dec. 15, 2016; provisional U.S. Application No. 62/434,602, filed on Dec. 15, 2016; provisional U.S. Application No. 62/434,603, filed on Dec. 15, 2016; and provisional U.S. Application No. 62/458,749, filed on Feb. 14, 2017. Each aforementioned provisional application is incorporated herein by reference in its entirety.

BACKGROUND

This invention generally relates to encoding and decoding content, and more specifically to adaptively encoding and decoding content based on characteristic objects in the content.

Various online systems transmit information to and from one another over a network. The information may be, for example, content such as an image or video, or a string of text such as an e-mail or word document. Typically, the sender encodes the information into a compressed code such that the compressed code can be efficiently transmitted to the receiver. The receiver can then decode the compressed code to reconstruct the original information. For example, responsive to a request to download a particular image from a client device, an image sharing website may encode the image and transmit the compressed code to the client device. The sender may also compress the information into different levels according to the available bandwidth at the sender or receiver.

Often times, it is advantageous for certain portions of content to be encoded with a different degree of information over others. For example, these portions may be allocated a greater number of bits in the compressed code and are reconstructed at the receiver at a higher quality than the remaining portions of the content. The image sharing website may desire to preferentially encode regions of an image associated with human faces over those associated with the background, since viewers tend to focus greater attention on the human faces. However, it is often difficult to adaptively encode such regions-of-interest with good accuracy and computational efficiency.

SUMMARY

A compression system trains a machine-learned autoencoder, which includes an encoder and a decoder. The encoder can be deployed by a sender system to encode content for transmission to a receiver system, and the decoder can be deployed by the receiver system to decode the encoded content and reconstruct the original content. The encoder receives content and generates a tensor as a compact representation of the content. The content may be, for example, images, videos, or text. The decoder receives a tensor and generates a reconstructed version of the content. In one embodiment, the compression system trains one or more encoding components such that the encoder can adaptively encode a higher or lower degree of information for regions in the content that are associated with characteristic objects, such as human faces, texts, or buildings.

When the training process for the autoencoder is completed, the compression system provides the sender system with encoding components including the machine-learned encoder and an entropy coder for compressing the tensors into compressed code that can be transmitted to the receiver system. The entropy coder is associated with an entropy decoder that performs an inverse operation of the entropy coder. The compression system also provides the receiver system with decoding components including the entropy decoder for synthesizing tensors from compressed code, and the machine-learned decoder.

The compression system trains the autoencoder using a set of training content to reduce a loss function. In one embodiment, the loss function includes a reconstruction loss that represents dissimilarity between the original and reconstructed versions of the training content. The compression system reduces the loss function by repeatedly iterating between a forward pass step and a backpropagation step. During the forward pass step, the autoencoder generates reconstructed content by applying the autoencoder with an estimated set of parameters to the training content. During the backpropagation step, the compression system determines the reconstruction loss based on dissimilarity between the reconstructed content and the training content. The compression system repeatedly updates the estimated set of parameters by backpropagating error terms obtained from the loss function to determine the final set of parameters.

In one embodiment, the compression system trains the autoencoder such that the encoder can adaptively encode a different degree of information for regions in the content that are associated with characteristic objects. In one instance, the characteristic objects may be objects that viewers of content tend to focus more on than remaining portions of the content, and thus, may benefit from higher quality reconstruction. For example, the characteristic objects may be human faces, text, or buildings. In another instance, the characteristic objects may be objects that are less important for viewers and can be de-emphasized in the reconstructed content. For example, the characteristic objects may be vegetation, clouds, or waves. The encoder adaptively encodes these regions-of-interest based on a weighted map for the content that indicate weights for elements of the tensor associated with the characteristic objects.

Specifically, the compression system trains the autoencoder such that responsive to receiving a weighted map for a training content, the encoder applies the weighted map to the tensor for the training content to generate a weighted tensor. A higher degree of information is encoded in the weighted tensor for elements associated with the characteristic objects in the training content. Each weighted map contains previously known weights for elements of the corresponding tensor that are associated with the characteristic objects in the training content. The weighted maps may be constructed at a previous time by human operators or machine-learned object detection algorithms. In such an embodiment, the compression system determines the reconstruction loss based on the reconstructed content synthesized by applying the decoder to the weighted tensors. In this manner, the parameters of the autoencoder are determined to generate a tensor that when combined with the weighted map for the content, can be used to reconstruct the content at a higher or lower quality for regions associated with characteristic objects.

In one embodiment, the compression system may further include a map generator that generates the weighted map for the content. The compression system trains the map generator using the set of weighted maps for the training content. The compression system trains the map generator to reduce a weighted map loss that represents a dissimilarity between the weighted map and the estimated map generated by applying the map generator to the training content.

In one embodiment, the compression system trains the map generator in a separate process from the training process of the autoencoder. In such an instance, the map generator may be configured to receive content and generate the weighted map for the content. During the forward pass step, the map generator generates a set of estimated maps by applying the map generator with an estimated set of parameters to the training content. During the backpropagation step, the compression system determines the weighted map loss based on the estimated maps and the weighted maps of the training content. The compression system repeatedly updates the estimated set of parameters of the map generator by backpropagating error terms obtained from the weighted map loss. This process is repeated until a predetermined criteria with respect to the weighted map loss is satisfied to determine the final set of parameters for the map generator.

In another embodiment, the compression system jointly trains the map generator with the autoencoder by coupling the map generator to the encoder. Specifically, the map generator may be embedded in the encoder itself or configured to receive any intermediate outputs from the encoder to generate the weighted map. The compression system jointly trains the map generator with the autoencoder to reduce a loss function including both a reconstruction loss and a weighted map loss. During the forward pass step, the autoencoder generates reconstructed content and the map generator generates estimated maps using an estimated set of parameters. During the backpropagation step, the compression system determines the loss function, and repeatedly updates the estimated set of parameters by backpropagating error terms from the loss function. By coupling the map generator to the encoder and jointly training the map generator with the autoencoder, the compression system can save computational resources compared to a separate training process for the map generator.

The sender system receives encoding components including the machine-learned encoder and the map generator to encode content for transmission to the receiver system. The sender system may adaptively encode a desired degree of information for regions of content associated with characteristic objects by applying a corresponding weighted map to the tensor of the content. The weighted map may be generated by the map generator from the content, or any intermediate outputs from the encoder. The encoded content is transmitted to the receiver system. The receiver system applies the decoding components including the machine-learned decoder to synthesize the reconstructed content from the encoded content.

Figure 1:
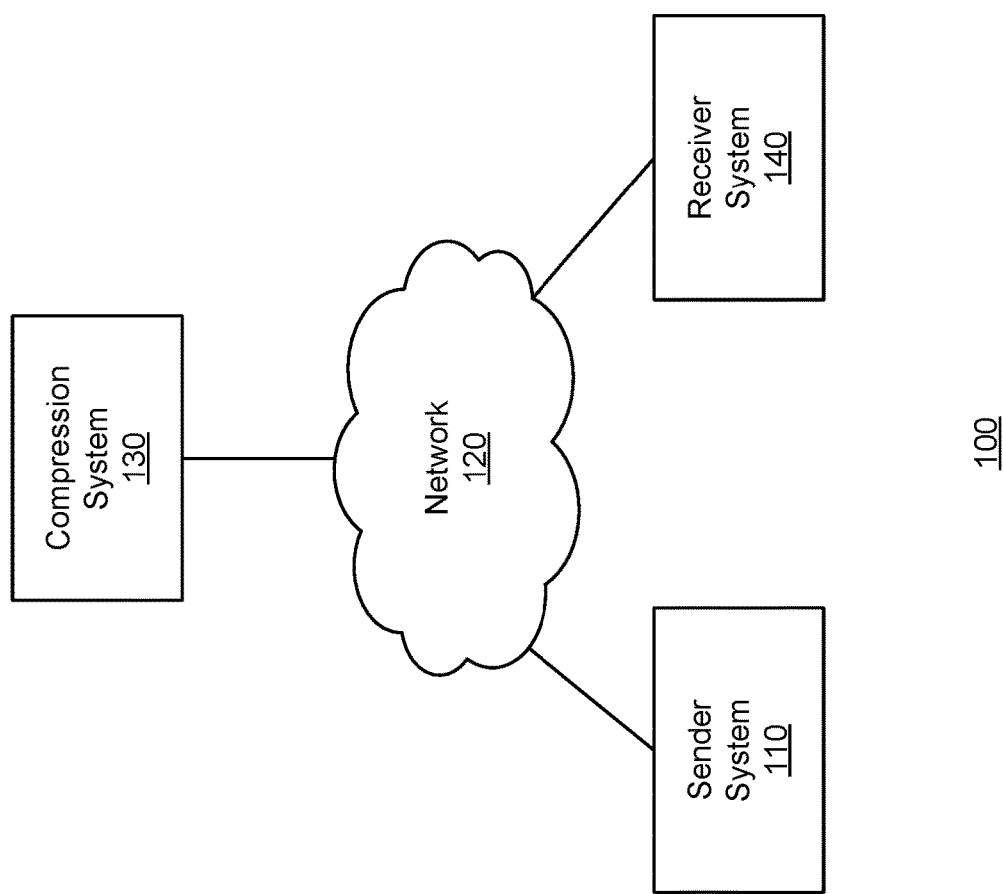
FIG. 1 is a block diagram of a system environment including a compression system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1 is a block diagram of a system environment 100 including a compression system 130, in accordance with an embodiment. The system environment 100 shown in FIG. 1 comprises a compression system 130, a sender system 110, a receiver system 140, and a network 120. In alternative configurations, different and/or additional components may be included in the system environment 100.

The compression system 130 trains a machine-learned encoder and decoder through an autoencoder architecture. The encoder can be deployed by a sender system 110 to encode content for transmission to a receiver system 140, and the decoder can be deployed by the receiver system 140 to decode the encoded content and reconstruct the original content. The encoder is coupled to receive content and output a tensor as a compact representation of the content. The content may be, for example, images, videos, or text. The decoder is coupled to receive a tensor representing content and output a reconstructed version of the content.

In one embodiment, the compression system 130 trains one or more encoding components such that the encoder can adaptively encode different degrees of information for regions in the content that are associated with characteristic objects, such as human faces, texts, buildings, and the like. For example, the compression system 130 may train the encoding components such that the encoder can preferentially encode a higher degree of information for these regions-of-interest. When decoded, regions of the reconstructed content associated with the characteristic objects may be reconstructed at a higher quality than the remaining regions of the content. As another example, the compression system 130 may train the encoding components such that the encoder can encode a lower degree of information for the regions-of-interest. When decoded, regions associated with the characteristic objects are reconstructed at a lower quality to de-emphasize the content in these regions.

When the training process for the autoencoder is completed, the compression system 130 provides the sender system 110 with encoding components including the machine-learned encoder and an entropy coder for compressing the tensors into compressed code that can be transmitted to the receiver system 140. The entropy coder is associated with an entropy decoder that performs an inverse operation of the entropy coder. The compression system 130 also provides the receiver system 140 with decoding components including the entropy decoder for synthesizing tensors from compressed code, and the machine-learned decoder.

The sender system 110 is an online system that transmits encoded content to one or more receiver systems 140. For example, the sender system 110 may be an image or video sharing website that transmits images and videos responsive to receiving requests from one or more receiver systems 140. The sender system 110 receives encoding components from the compression system 130 including the machine-learned encoder, and uses the encoding components to encode content for transmission to the receiver system 140. In one embodiment, the sender system 110 can use the encoding components to adaptively encode portions of the content associated with characteristic objects.

The receiver system 140 is an online system that receives compressed code from the sender system 110, and reconstructs the content using decoding components received from the compression system 130. For example, the receiver system 140 may be a client device for a user of an image sharing website that requests to download one or more images of the website. The receiver system 140 may receive the compressed code along with the decoding components, and use the decoding components to generate a reconstructed version of the content.

Figure 2:
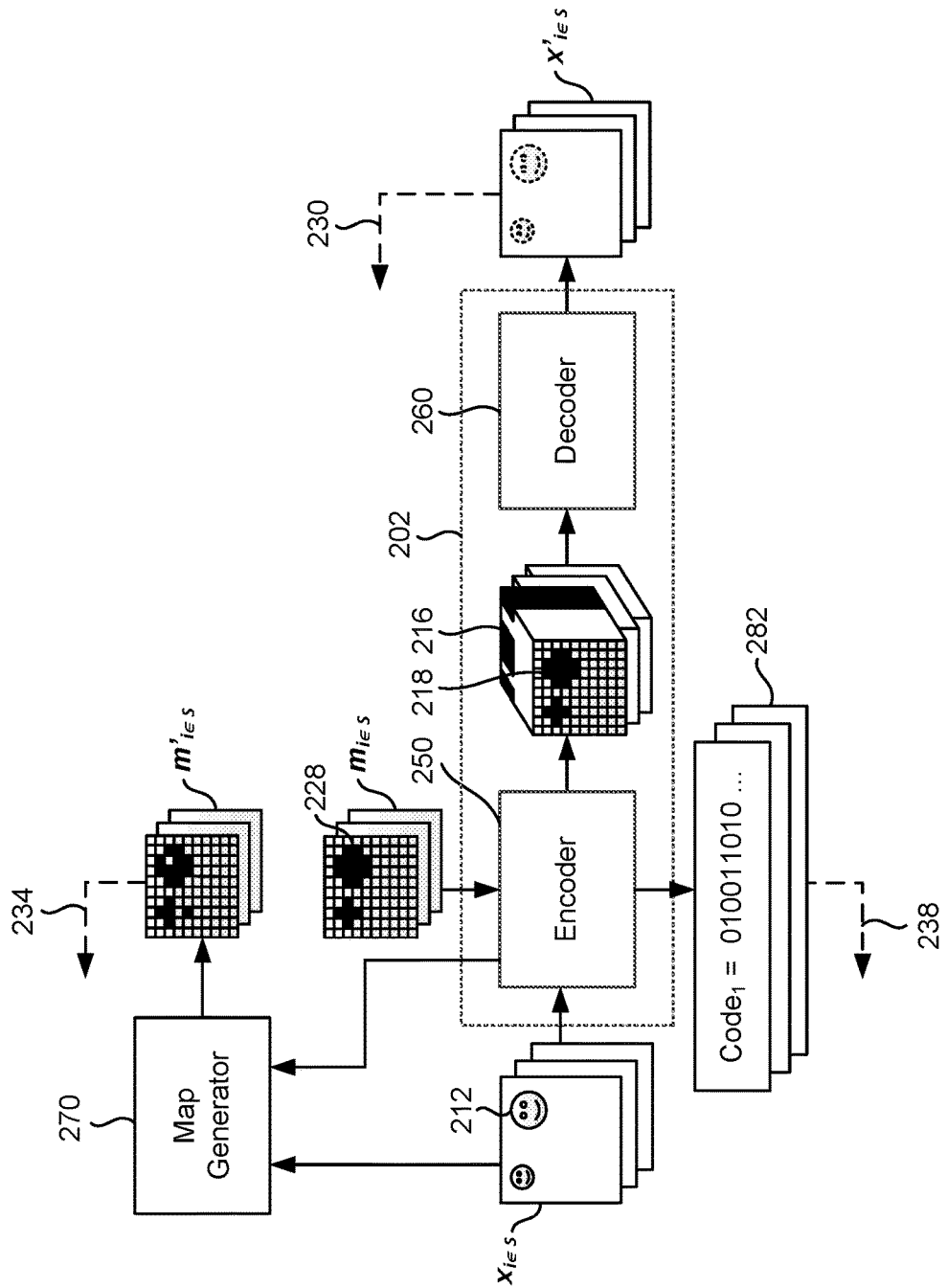
FIG. 2 illustrates a general process for training an autoencoder, in accordance with an embodiment.

FIG. 2 illustrates a general process for training an autoencoder 202, in accordance with an embodiment. The autoencoder 202 includes an encoder 250 and a decoder 260. The autoencoder 202 may also be coupled to a map generator 270. The compression system 130 jointly trains the parameters for the encoder 250 and the decoder 260 through an autoencoder architecture 200, in which the encoder 250 and the decoder 260 are coupled together. Specifically, the autoencoder 202 is coupled to receive content and output a tensor for the content by applying the encoder 250 to the content. The autoencoder 202 outputs a reconstructed version of the content by applying the decoder to the tensor.

The compression system 130 trains the autoencoder 202 using a set of training content $x_{i \in S}$ from a training set S to reduce a loss function. In one embodiment, the loss function includes a reconstruction loss 230 that represents dissimilarity between the original and reconstructed versions of the training content. By training the encoder 250 and the decoder 260 through the autoencoder architecture 202, the parameters of the encoder are configured to output a tensor for content that when synthesized by the decoder 260, generates reconstructed content closely resembling the structure of the original content. When the training process for the autoencoder is completed, the compression system 130 provides the sender system 110 with encoding components including the machine-learned encoder 250 and the entropy coder.

The compression system 130 reduces the loss function by repeatedly iterating between a forward pass step and a backpropagation step. During the forward pass step, the autoencoder 202 generates reconstructed content $x'_{i \in S}$ by applying the autoencoder 202 with an estimated set of parameters to the training content $x_{i \in S}$. During the backpropagation step, the compression system 130 determines the reconstruction loss 230 based on dissimilarity between the reconstructed content $x'_{i \in S}$ and the training content $x_{i \in S}$. The compression system 130 repeatedly updates the estimated set of parameters by backpropagating error terms obtained from the loss function. This process is repeated until the loss function satisfies a predetermined criteria.

In one embodiment, the compression system 130 may train the autoencoder 202 using a loss function that additionally includes a codelength regularization loss along with the reconstruction loss. The codelength regularization loss is determined based on the magnitude of the tensor values output by the encoder 250, and is repeatedly adjusted by the compression system 130 such that the length of the compressed code generated from the tensor achieves a desired target length. During the backpropagation step, the compression system 130 determines the loss function including the codelength regularization loss 238 along with the reconstruction loss 230. The codelength regularization loss 238 is determined based on the magnitude of the tensor values and the length of the compressed codes 282 that are generated by applying the entropy coder to the tensors.

By including the codelength regularization loss in the loss function, the encoder 250 can exploit the structure of the content to generate a tensor that reduces the length of the compressed code when possible while achieving reasonable reconstruction fidelity. For example, content with a simple structure may be encoded with a shorter code length than content with a complex structure. Including the codelength regularization loss allows the encoder 250 to generate a tensor with shorter code length when possible to exploit content with simple structures.

The compression system 130 trains the autoencoder 202 such that the encoder 250 can adaptively encode a different degree of information for regions in the content that are associated with characteristic objects. In one embodiment, the compression system 130 preferentially encodes a higher degree of information for these regions. In such an instance, the characteristic objects may be objects that viewers of content tend to focus more on than remaining portions of the content, and thus, may benefit from higher quality reconstruction. For example, the characteristic objects may be human faces, text, buildings, or any object for task-specific detection, such as cars, license plates, guns, cats, or tennis balls. As another example, the regions-of-interest may contain task-dependent activities, such as activities related to theft, or a slam dunk during a basketball game. As yet another example, the regions-of-interest may contain unusual objects in the scene of the content, such as a person in a forest in a search-and-rescue mission, or a small boat in the ocean. As yet another example, the regions-of-interest may be areas where the viewer of the content is more likely to look, or where viewers have looked in the past tracked through, for example, eye-tracking devices.

In another embodiment, the compression system 130 can encode a lower degree of information for regions-of-interest to de-emphasize the reconstruction quality of these regions. For example, the regions-of-interest may contain human faces that need to be de-emphasized for privacy issues, less important portions of scenery in the content such as vegetation, clouds, or water waves.

The encoder 250 adaptively encodes these regions-of-interest based on a weighted map for the content that indicate weights for elements of the tensor associated with the characteristic objects. Specifically, the compression system 130 trains the autoencoder 202 such that responsive to receiving a weighted map for a training content, the encoder 250 applies the weighted map to the tensor to output a weighted tensor. The weighted maps indicate weights for a subset of relevant elements associated with the characteristic objects in the content. For example, the weights may be binary values, in which elements associated with the objects have a value of 1, and elements that are not have a value of 0. A higher or lower degree of information is encoded in the weighted tensor for the subset of relevant elements than for the remaining elements. Each weighted map contains previously known weights for the elements that may be constructed at a previous time by human operators or machine-learned object detection algorithms.

During the forward pass step, the encoder 250 receives a set of weighted maps $m_{i \in S}$ for the set of training content $x_{i \in S}$, and generates the weighted tensors 216 for the training content $x_{i \in S}$. In the example shown in FIG. 2, the first piece of training content $x_{i=1}$ shows an image containing two human faces 212. The corresponding weighted map $m_{i=1}$ indicates weights 228 for elements of the tensor that are associated with the human faces 212 in the training content $x_{i=1}$. The modified tensor 216 for the first piece of training content $x_{i=1}$ contains a subset of weighted elements 218 corresponding to the human faces 212 in the content that contain a higher degree of information than the remaining elements.

During the backpropagation step, the compression system 130 determines the reconstruction loss 230 based on the reconstructed content $x'_{i \in S}$ synthesized by applying the decoder 260 to the weighted tensors 216. In this manner, the parameters of the autoencoder 202 are configured to generate a tensor that when combined with the weighted map for the content, can be used to reconstruct the content at a desired quality for regions associated with the characteristic objects.

In one embodiment, the compression system 130 may further include a map generator 270 that generates the weighted map for the content. The compression system 130 trains the map generator 270 using the set of weighted maps for the training content. The compression system 130 trains the map generator 270 to reduce a weighted map loss that represents a dissimilarity between the weighted map and the estimated map generated by applying the map generator 270 to the training content. When the map generator 270 is trained by the compression system 130, the compression system 130 may also provide the sender system 110 with the map generator 270 as an encoding component.

In one embodiment, the compression system 130 trains the map generator 270 in a separate process from the training process of the autoencoder 202. In such an instance, the map generator 270 is coupled to receive content and output the weighted map for the content. During the forward pass step, the map generator 270 generates a set of estimated maps $m'_{i \in S}$ by applying the map generator 270 with an estimated set of parameters to the training content $x_{i \in S}$. During the backpropagation step, the compression system 130 determines the weighted map loss 234 based on the estimated maps $m'_{i \in S}$ and the weighted maps $m_{i \in S}$. The compression system 130 repeatedly updates the parameters of the map generator 270 by backpropagating error terms obtained from the weighted map loss 234. This process is repeated until the weighted map loss satisfies a predetermined criteria.

In another embodiment, the compression system 130 jointly trains the map generator 270 with the autoencoder 202 by coupling the map generator 270 to the encoder 250. Specifically, the map generator 270 may be embedded in the encoder 250 itself or configured to receive any intermediate outputs from the encoder 250 to generate the weighted maps. The compression system 130 jointly trains the map generator 270 with the autoencoder 202 to reduce a loss function including both a reconstruction loss 230 and a weighted map loss 234. During the forward pass step, the autoencoder 202 generates reconstructed content $x'_{i \in S}$ and the map generator 270 generates estimated maps $m'_{i \in S}$ using an estimated set of parameters. During the backpropagation step, the compression system 130 determines the loss function including both the reconstruction loss 230 and the weighted map loss 234, and repeatedly updates the estimated set of parameters by backpropagating error terms from the loss function. By coupling the map generator 270 to the encoder 250 and jointly training the map generator 270 with the autoencoder 202, the compression system 130 can save computational resources compared to a separate training process for the map generator 270.

Figure 3:
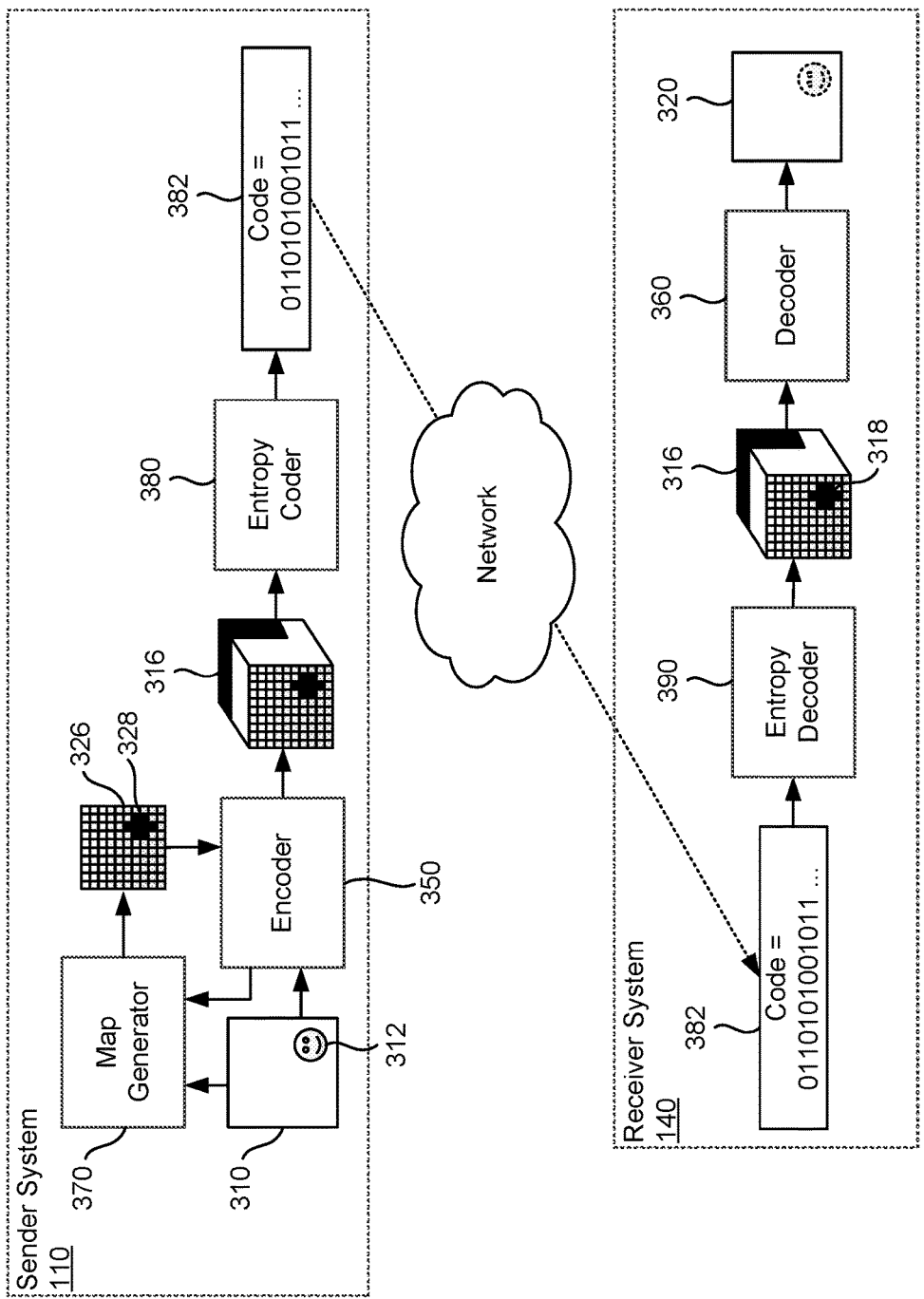
FIG. 3 illustrates a general deployment process for the encoder and the decoder, in accordance with an embodiment.

FIG. 3 illustrates a general deployment process for a machine-learned encoder 350 and the machine-learned decoder 360, in accordance with an embodiment. After the training process for the autoencoder and the map generator have been completed, the sender system 110 receives encoding components including the encoder 350, the entropy coder 380, and optionally a map generator 370 from the compression system 130. The receiver system 140 receives decoding components including the decoder 360 and the entropy decoder 390 from the compression system 130.

The sender system 110 applies the encoding components to encode content for transmission to the receiver system 140. Specifically, the sender system 110 generates a tensor for the content to be transmitted by applying the encoder 350 to the content, and generates a compressed code for the content by applying the entropy coder to the tensor. The sender system 110 may then transmit the compressed code to the receiver system 140. In one embodiment, the sender system 110 may adaptively encode a higher degree of information for regions in the content associated with characteristic objects, given a weighted map for the content. Specifically, the sender system 110 generates a weighted tensor by applying the encoder to the content and the weighted map for the content. The sender system 110 generates the compressed code by applying the entropy coder to the weighted tensor. In one embodiment, the sender system 110 generates the weighted map for the content by applying the map generator 270 to the content.

In the example shown in FIG. 3, the content 310 contains a human face 312. The encoder 250 also identifies a weighted map 326 for the content 310 indicating weights 328 for elements associated with the human face 312. The weighted map 326 may be separately provided to the sender system 110, or may be generated by the map generator 370. The encoder 350 applies the weighted map 326 to the tensor for the content 310 to generate a weighted tensor 316. The sender system 110 applies an entropy coder 280 to the weighted tensor 316 to generate a compressed code 382. The compressed code 382 is provided to the receiver system 140.

The receiver system 140 applies the decoding components to synthesize the reconstructed content from the compressed code. Specifically, the receiver system 140 synthesizes a tensor by applying the entropy decoder 390 to the compressed code, and generates the reconstructed content by applying the machine-learned decoder 360 to the synthesized tensor. In one embodiment, the receiver system 140 receives compressed code from a sender system 110 adaptively encoded to contain a desired degree of information for regions of the content associated with certain characteristic objects. Responsive to receiving the compressed code, the receiver system 140 synthesizes the weighted tensor for the content by applying the entropy decoder 390 to the compressed code. The receiver system 140 generates the reconstructed content by applying the decoder 360 to the weighted tensor. Due to the properties of the weighted tensor, the receiver system 140 may reconstruct regions of the content associated with the characteristic objects at a different quality than remaining regions of the content.

In the example shown in FIG. 3, the receiver system 140 applies the entropy decoder 390 to the compressed code 382 to synthesize the weighted tensor 316. Elements 318 of the weighted tensor 316 associated with the human face 312 contain a higher degree of information than remaining elements. The receiver system 140 applies the decoder 360 to the weighted tensor 316 to generate the reconstructed content 320. The regions of reconstructed content 320 associated with the characteristic objects may be reconstructed at a different quality than other regions.

Training Process of Autoencoder and Map Generator

Figure 4:
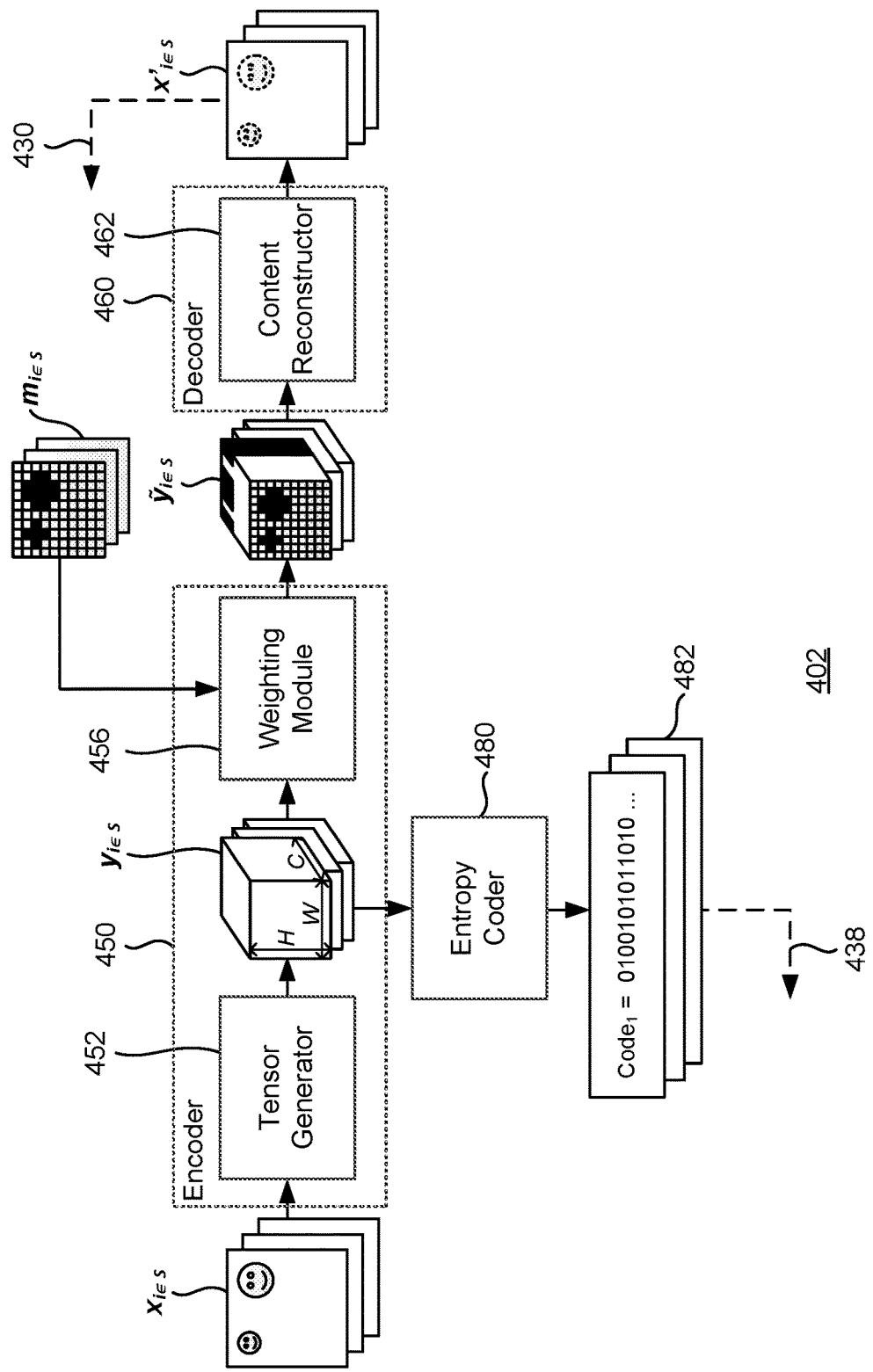
FIG. 4 illustrates a process of training an autoencoder, in accordance with an embodiment.

FIG. 4 illustrates a detailed process of training an autoencoder 402, in accordance with an embodiment.

The encoder 450 of the autoencoder 402 further includes a tensor generator 452 and a weighting module 456. The decoder 460 of the autoencoder 402 further includes a content reconstructor 462. The autoencoder 402 shown in FIG. 4 is trained to reduce a loss function including a reconstruction loss, and optionally, a codelength regularization loss. The parameters $\theta_a$ of the autoencoder 402 are updated based on error terms obtained from the loss function.

The tensor generator 452 is coupled to receive content and output a tensor for the content. In one embodiment, the tensor generator 452 is a neural network model defined by a series of parameterized functions. Specifically, a tensor y for content x may be generated by:

$$y = f_g(x; \theta_g) \in \mathbb{R}^{C \times H \times W}$$

where $f_g(\cdot)$ denotes the functions of the tensor generator 452 associated with a set of parameters $\theta_g$. The tensor y has dimensions of width W, height H, and depth C, in which $y_{chw}$ denotes an element of the tensor at channel depth c=1, 2, ..., C, height h=1, 2, ..., H, and width w=1, 2, ..., W. The tensor y is a compact representation of the content with respect to the structural features of the content. Specifically, each W×H feature map of the tensor y at a particular channel depth c may be associated with the presence of a corresponding structural feature in the content x. During the forward pass step, the set of tensors $y_{i \in S}$ may be generated by applying the tensor generator 452 to the set of training content $x_{i \in S}$. In the example shown in FIG. 4, each tensor $y_i$ is shown to have dimensionality C×H×W.

Although not shown in FIG. 4, in one embodiment, the encoder 450 may optionally perform one or more additional operations on the tensor y. In one instance, the encoder 450 performs a quantization operation such that each element of the tensor y is classified into B equal-sized bins. Specifically, the element chw of a quantized tensor $\hat{y}$ may be given by:

$$\hat{y}_{chw} = \frac{1}{2^{B-1}} [2^{B-1} \cdot y_{chw}]$$

where B denotes the number of desired bins. In another instance, the encoder performs a bitplane decomposition operation such that the tensor y may be represented as a binary tensor. Each element of the binary tensor b is a binary expansion of the corresponding element in y into B bits. Thus, each map $y_c \in \mathbb{R}^{H \times W}$ at a particular channel c is expanded into B binary bitplanes. The encoder may perform bitplane decomposition on the quantized tensor $\hat{y}$. The resulting binary tensor b is given by:

$$b = \text{Decompose}(\hat{y}) \in \{0,1\}^{B \times C \times H \times W}$$

The weighting module 456 is coupled to receive the weighted map $m \in \mathbb{R}^{H \times W}$ for content x and output the weighted tensor $\tilde{y}$ by weighting the tensor y with the weighted map m. Specifically, each element of the tensor y may be weighted with the corresponding element of m. The weighted map m indicates weights for a subset of relevant elements associated with the characteristic objects in content x. The weighted map m may have dimensionality H×W corresponding to the height and width of the tensor y. For example, the weighted map m may be a binary map in which each element corresponding to the tensor y is classified as a binary value (e.g., 0 or 1) depending on whether the element is associated with the characteristic objects in the content x. Alternatively, each element in the weighted map m may have a continuous numerical value indicating a likelihood or degree that the element is associated with the characteristic objects in the content x.

After the weighting operations have been performed, the subset of relevant elements in the weighted tensor y contain a different degree of information than the remaining elements of the tensor. Specifically, the weighted tensor $\tilde{y}$ may be generated by:

$$\tilde{y} = f_w(y; m)$$

where $f_w(\cdot)$ denotes the weighting operations of the weighting module 456 according to the weighted map m. During the forward pass step, the set of weighted tensors $\tilde{y}_{i \in S}$ may be generated by applying the weighting module 456 to the tensors $y_{i \in S}$. Specifically, the weighting module 456 receives a set of weighted maps $m_{i \in S}$ that each correspond to a training content $x_i$, and generates the weighted tensors $\tilde{y}_{i \in S}$ by applying the weighted maps $m_{i \in S}$ to corresponding tensors $y_{i \in S}$.

In one embodiment, the weighting operation $f_w(\cdot)$ includes masking off information contained across a subset of channel depths for elements depending on whether the elements are included in the subset of relevant elements. For example, when preferentially encoding a higher degree of information for the relevant elements, the weighting module 456 may discard information contained in the last 5 channels c=C-4, C-3, C-2, C-1, C of the tensor y if elements are not included in the subset, while the information is retained if elements included in the subset. As another example, when encoding a lower degree of information for the relevant elements, the weighting module 456 may discard information in the channels of the tensor y if elements are included in the subset. By adjusting the amount of information contained across channel depths, the weighting module 456 can adjust the degree of information related to the structural features of the content for elements of the tensor $\tilde{y}$ that are associated with the objects in the content x with respect to the remaining elements. In the example of FIG. 4, the weighting module 456 performs a weighting operation in which information across a subset of channels are discarded, or set as 0, for elements that are not included in the subset, while information across these subset of channels are retained for those that are included in the subset.

In another embodiment, the weighting operation $f_w(\cdot)$ is a quantization operation, in which elements of the tensor y are quantized to different degrees according to the weights indicated in the map m. Specifically, the subset of relevant elements in the tensor y may be quantized with higher granularity than elements that are not included in the subset when preferentially encoding a higher degree of information for the relevant elements, while the subset of relevant elements may be quantized with lower granularity when encoding a lower degree of information for the relevant elements. For example, the weighting module 456 may quantize elements in the relevant subset into $B_1$ bins, while the remaining elements are quantized into a smaller $B_2 < B_1$ number of bins. By adjusting the degree of quantization, the weighting module 456 can adjust the level of granularity of information associated with the regions of content x containing the characteristic objects.

The content reconstructor 462 is coupled to receive the weighted tensor $\hat{y}$ and synthesize the reconstructed content x'. During the forward pass step, the content reconstructor 462 receives the set of weighted tensors $\hat{y}_{i \in S}$ and synthesizes a set of reconstructed content $x'_{i \in S}$ that correspond to the training content $x_{i \in S}$. In one embodiment, the content reconstructor 462 is a neural network model defined by a series of parameterized functions. Specifically, the reconstructed content x' may be given by:

$$x' = f_r(\hat{y}; \theta_r)$$

where $f_r(\bullet)$ denotes the functions of the content reconstructor 462 associated with a set of parameters $\theta_r$. Collectively combining the operations of the autoencoder 402, the reconstructed content x' corresponding to the content x may be represented as:

$$x' = f_r(f_w(f_g(x; \theta_g); m); \theta_r).$$

During the backpropagation step, the compression system 130 determines the loss function, and repeatedly updates the parameters $\theta_a$ of the autoencoder 402 by backpropagating the error terms obtained from the loss function. The error terms may be determined based on the negative gradient of the loss function with respect to the parameters $\theta_a$ of the autoencoder 402.

In one embodiment, the loss function may be given by the reconstruction loss:

$$\mathcal{L}_{(x_{i \in S}, x'_{i \in S}; \theta_a)} = \mathcal{L}_r(x_{i \in S}, x'_{i \in S}; \theta_a)$$

where $\theta_a$ indicates the collective set of parameters for the autoencoder 402 and $L_r$ indicates the reconstruction loss. During the backpropagation step, the compression system 130 determines the reconstruction loss 430 based on the reconstructed content $x'_{i \in S}$ output by the forward pass step. In another embodiment, the loss function additionally includes the codelength regularization loss. The loss function may be given by the combination of the reconstruction loss and the codelength regularization loss:

$$\mathcal{L}_{(x_{i \in S}, x'_{i \in S}; \theta_a)} = \mathcal{L}_r(x_{i \in S}, x'_{i \in S}; \theta_a) + \mathcal{L}_{cl}(\hat{y}_{i \in S}; \alpha)$$

where $L_{cl}$ indicates the codelength regularization loss. During the backpropagation step, the compression system 130 determines the codelength regularization loss 438 along with the reconstruction loss 430 to generate the loss function.

In one embodiment, the reconstruction loss 430 is given by:

$$\mathcal{L}_r(x_{i \in S}, x'_{i \in S}; \theta_a) = \sum_{i \in S} \|x_i - x'_i\|^2$$

that indicates a pixel-by-pixel difference between the training content and the reconstructed content. In another embodiment, the reconstruction loss 430 is determined by weighting the dissimilarity between the training content $x_i$ and reconstructed content $x'_i$ based on the corresponding weighted map $m_i$. Specifically, the dissimilarity between an element at position hw of the training content $x_i^{hw}$ and the reconstructed content $x'^{hw}_i$ may be weighed by the weight $m_i^{hw}$ of the corresponding weighted map. In one instance, the reconstruction loss 430 may be given by:

$$\mathcal{L}_r(x_{i \in S}, x'_{i \in S}; \theta_a) = \sum_{i \in S} \sum_{hw} m_i^{hw} \cdot (x_i^{hw} - x'^{hw}_i)^2.$$

where the difference between the training content and the reconstructed content are multiplied by the corresponding weight in the weighted map. By weighting the dissimilarity of the training content and the reconstructed content based on the weighted map, the autoencoder 402 is trained to retain higher fidelity for regions of the training content that are associated with the characteristic objects.

In one embodiment, the codelength regularization 438 loss is given by:

$$\mathcal{L}_{cl}(\hat{y}_{i \in S}; \alpha) = \sum_{i \in S} \left[ \frac{\alpha_t}{CHW} \cdot \sum_{chw} \left[ \log_2 |\hat{y}_{i,chw}| + \sum_{(x,y) \in U} \log_2 |\hat{y}_{i,chw} - \hat{y}_{i,(h-y)(w-x)}| \right] \right]$$

where U is the set $\{(0, 1), (1, 0), (1, 1), (-1, 1)\}$, $\alpha_t$ is a weight, and $\hat{y}_{i,chw}$ denotes element chw of the quantized set of tensors for the training content. The compression system 130 may adjust the weight at of the codelength regularization loss 438 according to the length of the compressed code 482 generated by applying the entropy coder 480 to the set of quantized tensors $\hat{y}_{i \in S}$. Specifically, the compression system 130 increases the weight $\alpha_t$ if the length of the compressed codes 482 is above a target length, and decreases the weight $\alpha_t$ if the length is below a target length. The compression system 130 may adjust the weight $\alpha_t$ at each backpropagation step. In this manner, parameters of the encoder 450 are trained to generate tensors that exploit relatively simple structures of the content when possible.

Figure 5:
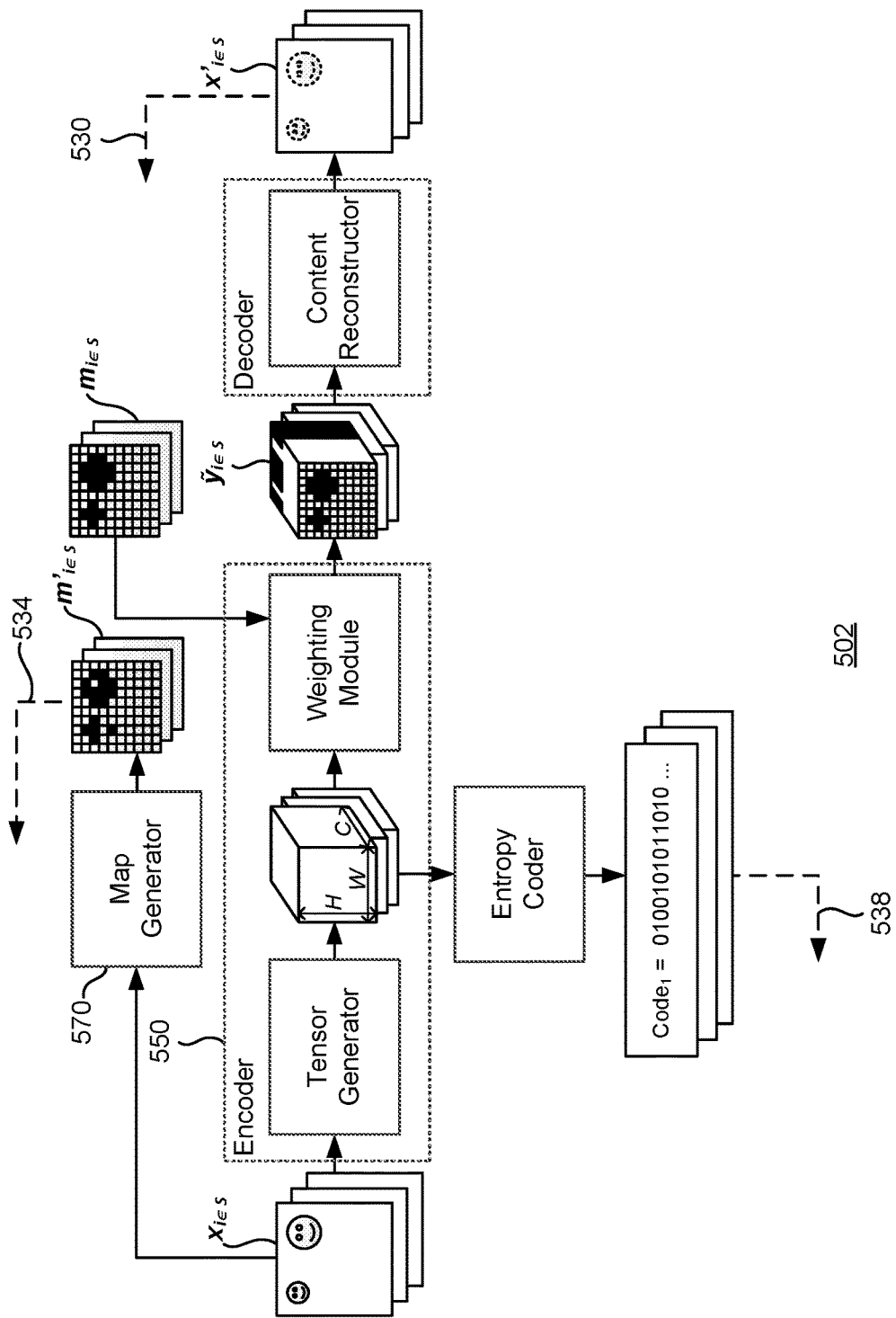
FIG. 5 illustrates a process of training an autoencoder and a map generator, in accordance with another embodiment.

FIG. 5 illustrates a detailed process of training an autoencoder 502 and a map generator 570, in accordance with another embodiment. The example training process shown in FIG. 5 is similar to that of the training process shown in FIG. 4, except that the compression system 130 also trains a map generator 570. The map generator 570 is trained to reduce a weighted map loss that indicates a dissimilarity between the weighted maps $m_{i \in S}$ for the training content and the estimated maps $m'_{i \in S}$ generated during the training process. The parameters $\theta_m$ of the map generator 570 are updated based on error terms obtained from the weighted map loss.

The map generator 570 is coupled to receive content x and generate a weighted map m for the content. During the forward pass step, the estimated maps $m'_{i \in S}$ are generated by applying the map generator 570 with a set of estimated parameters to the training content $x_{i \in S}$. During the backpropagation step, the compression system 130 determines the weighted map loss 534 based on corresponding pairs of $m_{i \in S}$ and $m'_{i \in S}$, and repeatedly updates the parameters $\theta_g$ of the map generator 570 by backpropagating error terms obtained from the weighted map loss 534. The error terms are determined based on the negative gradient of the weighted map loss with respect to the parameters $\theta_m$ of the map generator 570. In one embodiment, the weighted map loss 534 may be given by:

$$\mathcal{L}_m(m_{i\in S}, m'_{i\in S}; \theta_m) = \sum_{i\in S} \|m_{i\in S} - m'_{i\in S}\|^2$$

that indicates an element-by-element difference between the weighted maps and the estimated maps.

Figure 6:
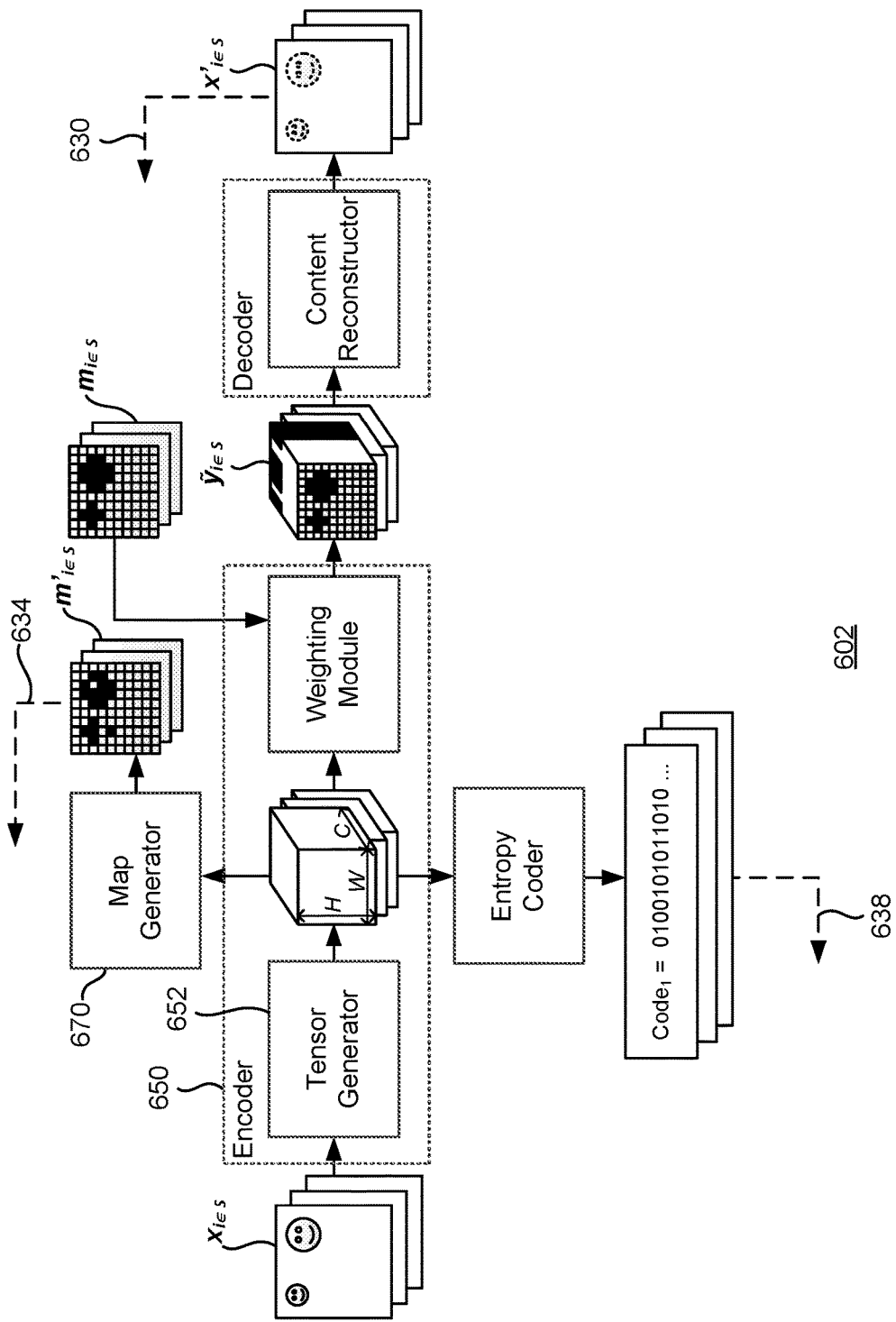
FIG. 6 illustrates a process of training an autoencoder and a map generator, in accordance with another embodiment.

FIG. 6 illustrates a detailed process of training an autoencoder 602 and a map generator 670, in accordance with another embodiment. In the example training process shown in FIG. 6, the map generator 670 is coupled to the encoder 650 of the autoencoder 602. The autoencoder 602 and the map generator 670 are trained to reduce a loss function including both a reconstruction loss and a weighted map loss. The parameters $\theta_a$ of the autoencoder 602 and the parameters $\theta_g$ of the map generator 670 are updated based on error terms obtained from the loss function.

The map generator 670 is coupled to receive the tensor y generated by the tensor generator 652 and generate the estimated map m'. In the embodiment of FIG. 6, the parameters of the encoder 650 affect both the output of the map generator 670 and the autoencoder 602 since the map generator 670 is coupled to the encoder 650. Specifically, the parameters of the tensor generator 652 determines the tensor y that is used to determine the estimated maps m' and the reconstructed content x'. Thus, the autoencoder 602 and the map generator 670 coupled to the autoencoder 602 are jointly trained together to reduce a loss function including both the reconstruction loss and the weighted map loss. During the forward pass step, the tensors $y_{i\in S}$ and the reconstructed content $x'_{i\in S}$ are generated by applying the autoencoder 602 with a set of estimated parameters to the training content $x_{i\in S}$. In the same forward pass step, the estimated maps $m'_{i\in S}$ are generated by applying the map generator 670 with a set of estimated parameters to the generated tensors $y_{i\in S}$.

During the backpropagation step, the compression system 130 determines the loss function, and repeatedly updates the parameters $\theta_a$ of the autoencoder 602 and the parameters $\theta_g$ of the map generator 670 by backpropagating the error terms obtained from the loss function. The error terms are determined based on the negative gradient of the loss function with respect to the parameters $\theta_a$ and $\theta_g$.

In one embodiment, the loss function is the summation of the reconstruction loss and the weighted map loss:

$$\mathcal{L}_{(x_{i\in S}, x'_{i\in S}; \theta_a, \theta_m)} = \mathcal{L}_r(x_{i\in S}, x'_{i\in S}; \theta_a) + \mathcal{L}_m(m_{i\in S}, m'_{i\in S}; \theta_a, \theta_m).$$

During the backpropagation step, the compression system 130 determines the reconstruction loss 630 along with the weighted map loss 634, and combines the loss terms to determine the loss function. In another embodiment, the loss function is the summation of the reconstruction loss, the weighted map loss, and the codelength regularization loss:

$$\mathcal{L}_{(x_{i\in S}, x'_{i\in S}; \theta_a, \theta_m)} = \mathcal{L}_r(x_{i\in S}, x'_{i\in S}; \theta_a) + \mathcal{L}_m(m_{i\in S}, m'_{i\in S}; \theta_a, \theta_m) + \mathcal{L}_{cl}(\hat{y}_{i\in S}; \alpha).$$

During the backpropagation step, the compression system 130 determines the codelength regularization loss 638, the reconstruction loss 630, and the weighted map loss 634, and combines the loss terms to determine the loss function.

Although FIG. 6 shows a training process in which the map generator is coupled to receive the tensor y and output the weighted map m, in other embodiments, the map generator may be coupled to any intermediate output of the encoder 650 to output the weighted map m. For example, the map generator 670 may be coupled to the output of one or more intermediate layers of the tensor generator 652.

Figure 7:
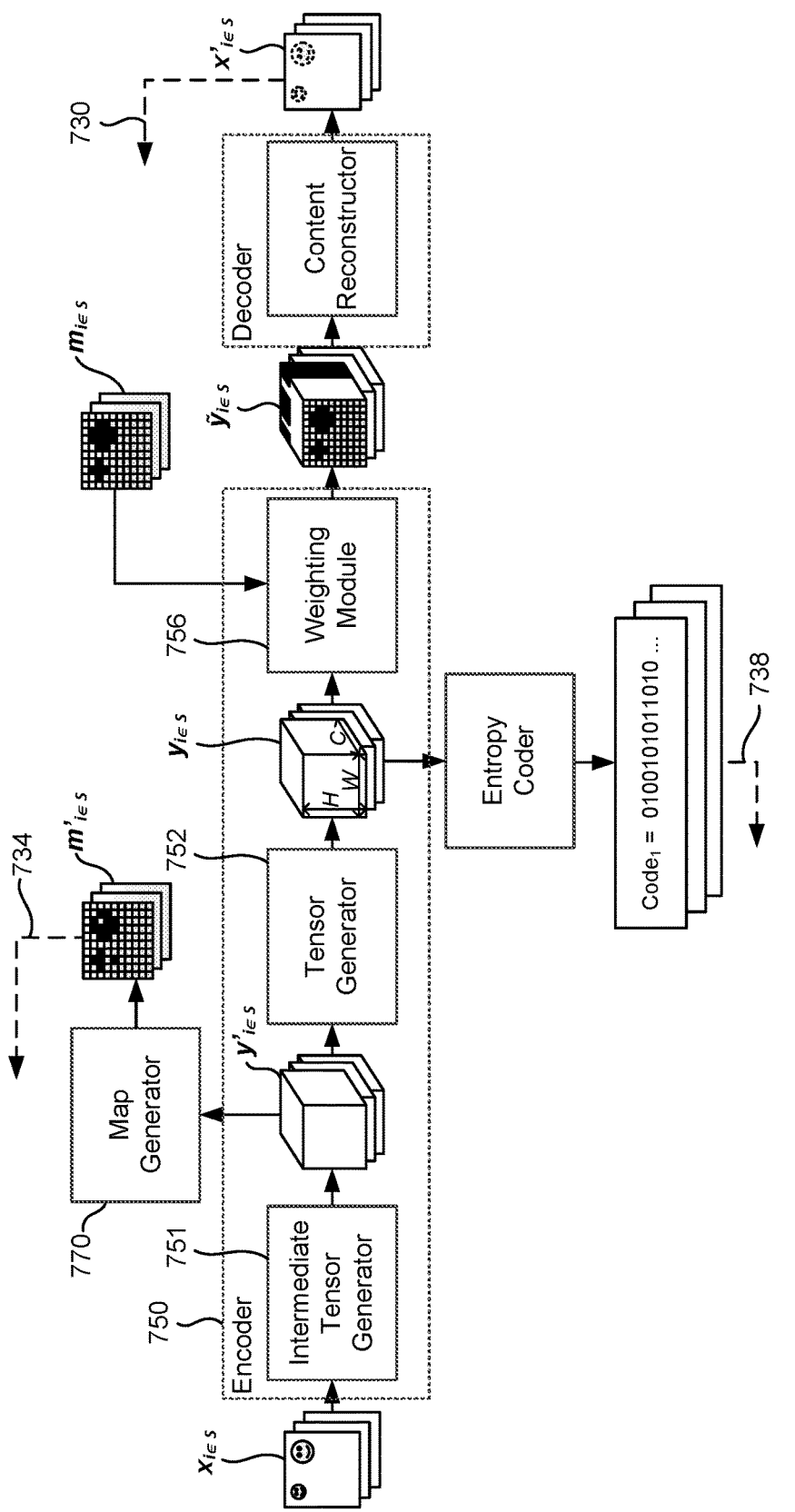
FIG. 7 illustrates a process of training an autoencoder and a map generator, in accordance with another embodiment.

FIG. 7 illustrates a detailed process of training an autoencoder 802 including the map generator, in accordance with another embodiment. In the example training process shown in FIG. 7, the map generator 770 is coupled to the encoder 750 of the autoencoder 702. The encoder 750 includes an intermediate tensor generator 751 and a tensor generator 752, along with a weighting module 756.

The intermediate tensor generator 751 is coupled to receive content x and output an intermediate tensor y'. The intermediate tensor y' is an intermediate representation of the content x, and may have different dimensionality than the tensor y output by the tensor generator 752. Specifically, an intermediate tensor y' for content x may be generated by:

$$y' = f_{ig}(x; \theta_{ig}) \in \mathbb{R}^{C_i \times H_i \times W_i}$$

where $f_{ig}(\cdot)$ denotes the functions of the intermediate tensor generator 451 associated with a set of parameters $\theta_{ig}$. In the training process of FIG. 7, the tensor generator 752 is coupled to receive the intermediate tensor y' and output the tensor y for content x, and the map generator 770 is coupled to receive the intermediate tensor y' and output the estimated map m'.

The autoencoder 702 and the map generator 770 coupled to the autoencoder 702 are jointly trained to reduce a loss function including both the reconstruction loss and the weighted map loss. During the forward pass step, the intermediate tensors $y'_{i\in S}$ the tensors $y_{i\in S}$, and the reconstructed content $x'_{i\in S}$ are generated by applying the autoencoder 702 with a set of estimated parameters to the training content $x_{i\in S}$. In the same forward pass step, the estimated maps $m'_{i\in S}$ are generated by applying the map generator 770 with a set of estimated parameters to the intermediate tensors $y'_{i\in S}$.

During the backpropagation step, the compression system 130 determines the loss function, and repeatedly updates the parameters $\theta_a$ of the autoencoder 702 and the parameters $\theta_g$ of the map generator 770 by backpropagating the error terms obtained from the loss function. The error terms are determined based on the negative gradient of the loss function with respect to the parameters $\theta_a$ and $\theta_g$. Similarly to the training process shown in FIG. 6, the loss function may be given by the summation of the reconstruction loss 730 and the weighted map loss 734, and may optionally include the codelength regularization loss 738.

Figure 8:
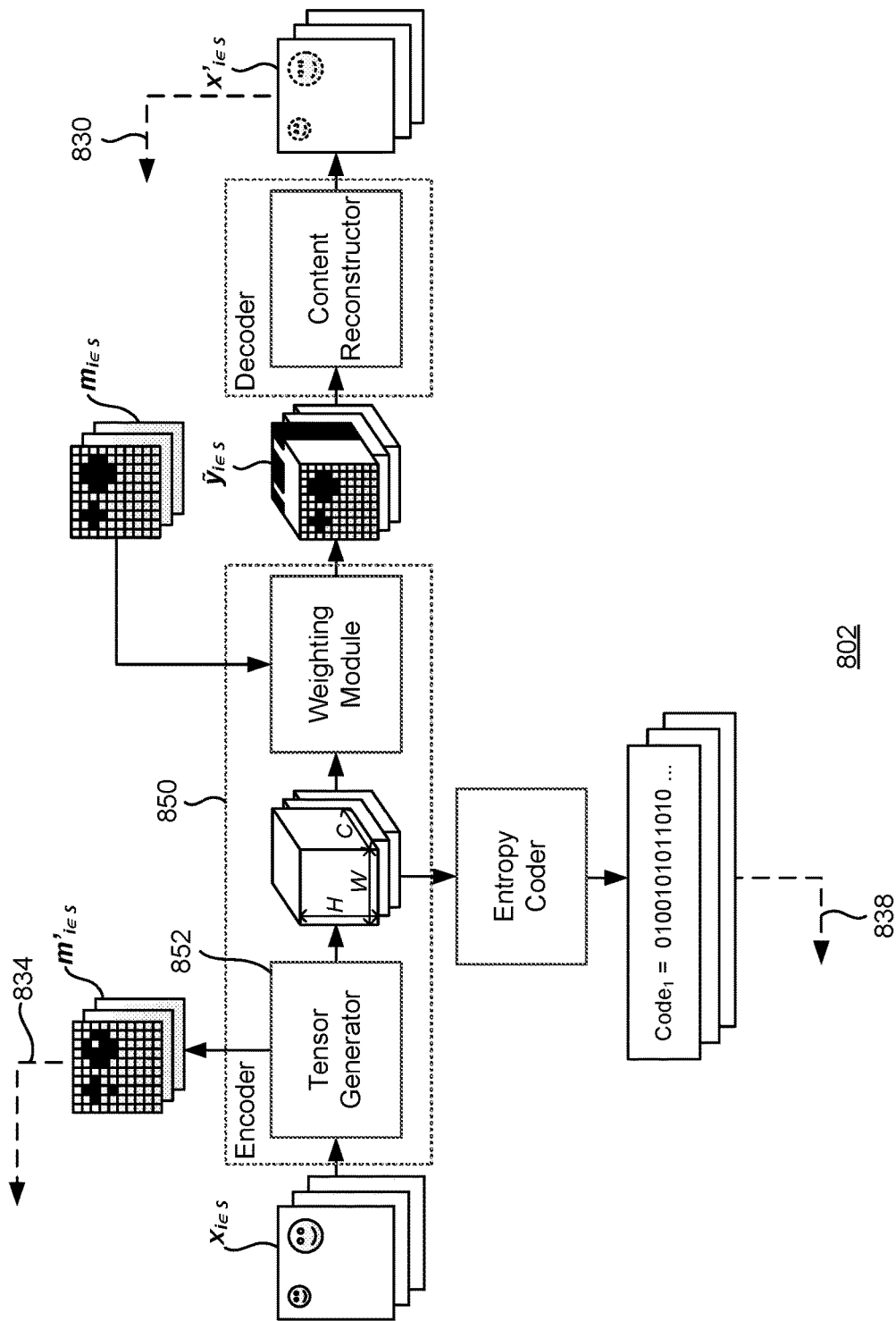
FIG. 8 illustrates a process of training an autoencoder including a map generator, in accordance with another embodiment.

FIG. 8 illustrates a detailed process of training an autoencoder 802 including the map generator, in accordance with another embodiment. In the example training process shown in FIG. 8, the map generator is included in the tensor generator 852 of the encoder 850. The autoencoder 802 is trained to reduce a loss function including both a reconstruction loss and a weighted map loss. The parameters $\theta_a$ of the autoencoder 802 are updated based on error terms obtained from the loss function.

The tensor generator 852 in FIG. 8 is coupled to receive content x and output both the tensor y and the estimated map m' for the content. Thus, the set of parameters for the tensor generator 852 determine both the tensors and estimated maps for content. The autoencoder 802 is trained to reduce a loss function including both the reconstruction loss and the weighted map loss. By training a tensor generator 852 configured to output both the tensors and the weighted maps for content, the compression system 130 can save computational resources compared to having an additional training process for a separate map generator. During the forward pass step, both the tensors $y_{i\in S}$ and the estimated maps $m'_{i\in S}$ are generated by applying the tensor generator 852 to the set of training content $x_{i\in S}$. The reconstructed content $x'_{i\in S}$ is generated by applying the remaining components of the autoencoder 802 to the tensors $y_{i \in S}$.

During the backpropagation step, the compression system 130 determines the loss function, and repeatedly updates the parameters $\theta_a$ of the autoencoder 802 based on the error terms obtained from the loss function. The error terms are determined based on the negative gradient of the loss function with respect to the parameters $\theta_a$ of the autoencoder 802. Similarly to the training process of FIGS. 6 and 7, the loss function may be the summation of the reconstruction loss 830 and the weighted map loss 834, and may optionally include the codelength regularization loss 838.

Deployment Process of Encoder and Decoder

Figure 9:
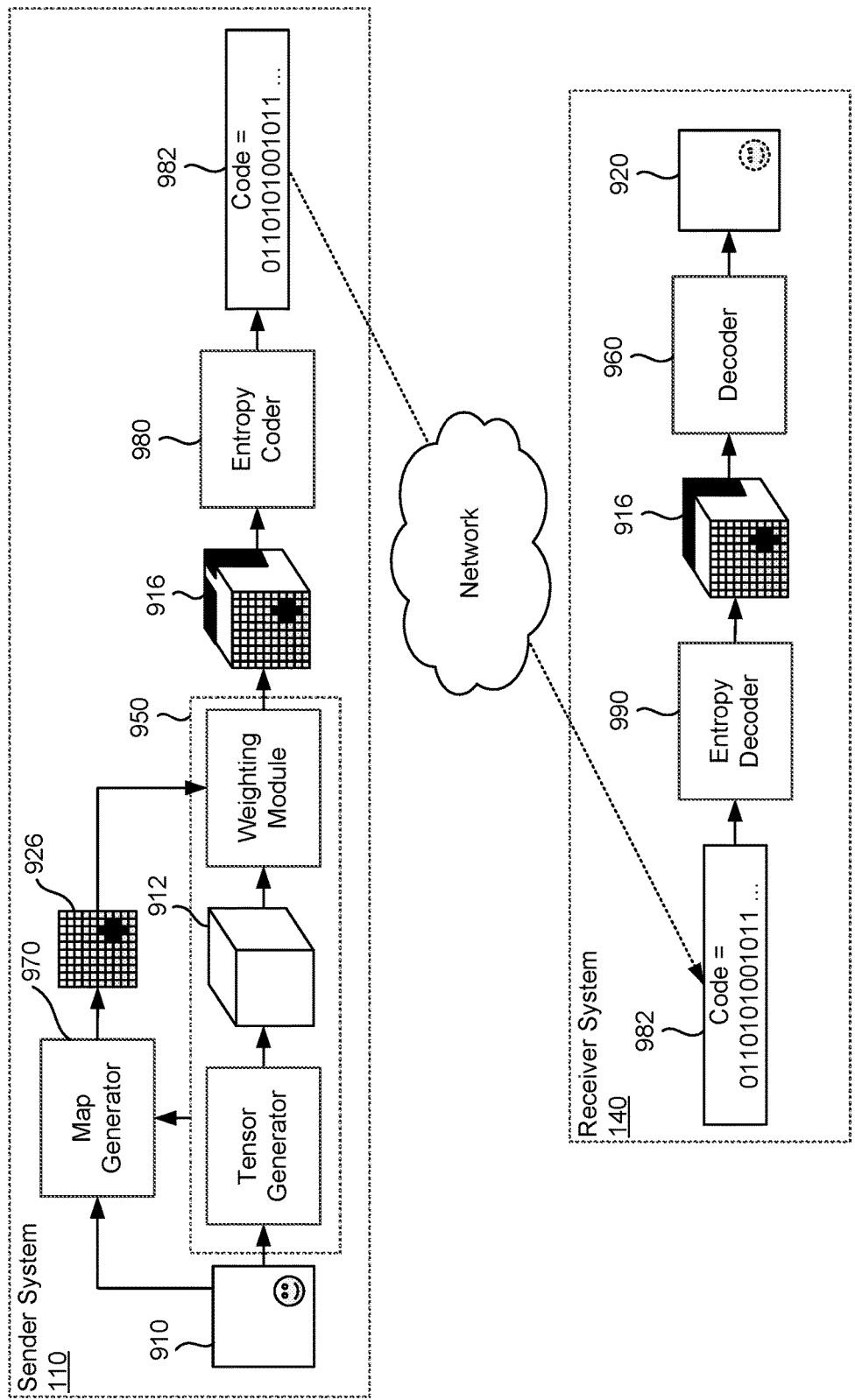
FIG. 9 illustrates a deployment process for the encoder and the decoder, in accordance with an embodiment.

FIG. 9 illustrates a detailed deployment process for the encoder 950 and the decoder 960, in accordance with an embodiment. The sender system 110 receives encoding components including the encoder 950, the entropy coder 980, and optionally a map generator 970 from the compression system 130. The receiver system 140 receives decoding components including the decoder 960 and the entropy decoder 990 from the compression system 130. The encoder 950, the decoder 960, and the map generator 970 may be trained through the autoencoder architectures shown in FIGS. 4-8. The encoder 950 includes the tensor generator 952 and the weighting module 956.

The sender system 110 applies the tensor generator to content 910 to output the tensor 912 for the content 810. The sender system 110 identifies a weighted map 926 for the content 810. The sender system 110 applies the weighting module to the tensor 912 with the weighted map 926 to generate the weighted tensor 916. In one embodiment, the weighted map 926 is identified by applying the map generator 970 to the content 910. In another embodiment, the map generator 970 is coupled to the encoder 950, and the weighted map 926 may be generated from the tensor generator 952, from the tensor 912, or from any intermediate output of the encoder 950. The sender system 110 applies the entropy coder 880 to the weighted tensor 916 to generate the compressed code 982 for the content 910.

The compressed code 982 is transmitted to the receiver system 140, such that the receiver system 140 can apply the entropy decoder 990 to the compressed code 982 to generate the weighted tensor 916, and apply the decoder 960 to the weighted tensor 916 to generate the reconstructed content 920.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An encoder stored on a non-transitory computer readable storage medium, wherein the encoder is manufactured by a process comprising:
    obtaining training content and weighted maps for the training content, each weighted map indicating weights for a first subset of elements of a tensor for the corresponding training content associated with characteristic objects in the training content;
    for a compression model including an encoding portion, a decoding portion, and a map generating portion,
        repeatedly backpropagating one or more error terms obtained from a loss function to update a set of parameters of the compression model, wherein the loss function includes:
            a reconstruction loss indicating a dissimilarity between the training content and reconstructed content, wherein the reconstructed content is generated by applying the encoding portion to the training content to generate first tensors for the training content, and applying the decoding portion to the first tensors to generate the reconstructed content, and
            a weighted map loss indicating dissimilarity between the weighted maps and estimated maps generated by applying the map generating portion to the training content or an output of the encoding portion; and stopping the backpropagation after the loss function satisfies a predetermined criteria; and storing the set of parameters of the encoding portion on the computer readable storage medium as parameters of the encoder, wherein the encoder is coupled to receive content and output a compressed code for the content using the stored parameters.

2. The encoder of claim 1, wherein the map generating portion is coupled to the encoding portion, and wherein the estimated maps are generated by applying the map generating portion to the first tensors of the training content.

3. The encoder of claim 1, wherein the map generating portion is included in the encoding portion, and wherein the estimated maps are generated with the first tensors by applying the encoding portion to the training content.

4. The encoder of claim 1, wherein the encoding portion includes a first tensor generating portion coupled to receive the training content and output intermediate tensors for the training content and a second tensor generating portion coupled to receive the intermediate tensors and output first tensors, and wherein the estimated maps are generated by applying the map generating portion to the intermediate tensors of the training content.

5. The encoder of claim 1, wherein the reconstructed content is generated by weighting each first tensor with the corresponding weighted map to generate a second tensor, and wherein the second tensor includes a different degree of information for the first subset of elements than a second subset of the remaining elements in the second tensor.

6. The encoder of claim 5, wherein weighting the first tensor with the weighted map comprises masking off, for the second subset of elements, information contained in a predetermined subset of channel depths of the first tensor.

7. The encoder of claim 5, wherein weighting the first tensor with the weighted map comprises quantizing the first subset of elements in the first tensor at a different granularity than the second subset of elements in the first tensor.

8. The encoder of claim 1, wherein the content is an image or a frame of a video, and the characteristic objects are at least one of a human face or text.

9. The encoder of claim 1, wherein the loss function further includes:

a codelength regularization loss indicating a cost of code lengths for compressed codes generated by applying an entropy coding technique to the first tensors, wherein the codelength regularization loss is determined based on magnitudes of elements of the first tensors.

10. An encoder stored on a non-transitory computer readable storage medium, wherein the encoder is configured to receive content and output a compressed code for the content, the encoder comprising:

a tensor generator programmed to receive content and output a first tensor for the content, wherein the first tensor includes a set of feature maps at corresponding channel depths of the first tensor that indicate presence of structural features in the content, wherein the tensor generator outputs the first tensor by applying a machine-learned model to the content, the machine-learned model trained using a network model that includes an encoding portion and a decoding portion coupled to the encoding portion, and wherein parameters of the machine-learned model are determined based on parameters of the encoding portion;

a weighting module coupled to receive the first tensor and a weighted map for the content and output a second tensor for the content, wherein the weighted map indicates weights for a first subset of elements associated with characteristic objects in the content, and wherein the second tensor is generated by weighting the elements of the first tensor with the weights of the weighted map such that the first subset of elements are associated with a different degree of information than a second subset of the remaining elements in the second tensor; and an entropy coder coupled to receive the second tensor and generate the compressed code for the content by applying an entropy coding technique to the second tensor.

11. The encoder of claim 10, wherein the encoder further comprises a map generator that outputs the weighted map for the content, wherein the network model further includes a map generating portion coupled to the encoding portion, and wherein parameters of the map generator are determined based on parameters of the map generating portion.

12. The encoder of claim 10, wherein the map generator is coupled to receive the content and output the weighted map for the content.

13. The encoder of claim 10, wherein the map generator is coupled to receive the first tensor and output the weighted map for the content.

14. The encoder of claim 10, wherein the tensor generator includes a first tensor generator coupled to receive the content and output an intermediate tensor for the content and a second tensor generator coupled to receive the intermediate tensor and output the first tensor for the content, and wherein the map generator is coupled to receive the intermediate tensor and output the weighted map for the content.

15. The encoder of claim 10, wherein the tensor generator is coupled to receive the content and output the weighted map for the content along with the first tensor.

16. The encoder of claim 10, wherein weighting the elements of the first tensor comprises masking off, for the second subset of elements in the first tensor, information contained in a predetermined subset of channel depths in the first tensor.

17. The encoder of claim 10, wherein weighting the elements of the first tensor comprises quantizing the first subset of elements in the first tensor at a different granularity than the second subset of elements.

18. The encoder of claim 10, wherein the content is an image or a frame of a video, and the characteristic objects are at least one of a human face or text.

19. A decoder stored on a non-transitory computer readable storage medium, wherein the decoder is manufactured by a process comprising:

obtaining training content and weighted maps for the training content, each weighted map indicating weights for a first subset of elements of a tensor for the corresponding training content associated with characteristic objects in the training content;

for a compression model including an encoding portion, a decoding portion, and a map generating portion, repeatedly backpropagating one or more error terms obtained from a loss function to update a set of parameters of the compression model, wherein the loss function includes:

a reconstruction loss indicating a dissimilarity between the training content and reconstructed content, wherein the reconstructed content is generated by applying the encoding portion to the training content to generate first tensors for the training content, and applying the decoding portion to the first tensors to generate the reconstructed content, and a weighted map loss indicating dissimilarity between the weighted maps and estimated maps generated by applying the map generating portion to the training content or an output of the encoding portion; and stopping the backpropagation after the loss function satisfies a predetermined criteria; and storing the set of parameters of the decoding portion on the computer readable storage medium as parameters of the decoder, wherein the decoder is coupled to receive a compressed code for content and output a reconstructed version of the content using the stored parameters.

20. The decoder of claim 19, wherein the map generating portion is coupled to the encoding portion, and wherein the estimated maps are generated by applying the map generating portion to the first tensors of the training content.

21. The decoder of claim 19, wherein the map generating portion is included in the encoding portion, and wherein the estimated maps are generated with the first tensors by applying the encoding portion to the training content.

22. The encoder of claim 19, wherein the encoding portion includes a first tensor generating portion coupled to receive the training content and output intermediate tensors for the training content and a second tensor generating portion coupled to receive the intermediate tensors and output the first tensors, and wherein the estimated maps are generated by applying the map generating portion to the intermediate tensors of the training content.

23. The decoder of claim 19, wherein the reconstructed content is generated by weighting each first tensor with the corresponding weighted map to generate a second tensor, and wherein the second tensor includes a different degree of information for the first subset of elements than a second subset of the remaining elements in the second tensor.

24. The decoder of claim 23, wherein weighting the first tensor with the weighted map comprises masking off, for the second subset of elements, information contained in a predetermined subset of channel depths of the first tensor.

25. The decoder of claim 23, wherein weighting the first tensor with the weighted map comprises quantizing the first subset of elements in the first tensor at a different granularity than the second subset of elements in the first tensor.

26. The decoder of claim 19, wherein the content is an image or a frame of a video, and the characteristic objects are at least one of a human face or text.

27. The decoder of claim 19, wherein the loss function further includes:
a codelength regularization loss indicating a cost of code lengths for compressed codes generated by applying an entropy coding technique to the first tensors, wherein the codelength regularization loss is determined based on magnitudes of elements of the first tensors.

* * * * *

UNITED STATES PATENT AND TRADEMARK OFFICE
CERTIFICATE OF CORRECTION

PATENT NO. : 10,402,722 B2
APPLICATION NO. : 15/844424
DATED : September 3, 2019
INVENTOR(S) : Oren Rippel et al.

Page 1 of 1

It is certified that error appears in the above-identified patent and that said Letters Patent is hereby corrected as shown below:

In the Claims

Column 19, Claim 22, Line 25, delete "The encoder of claim 19" insert -- The decoder of claim 19 --.

Signed and Sealed this
Fourteenth Day of April, 2020

Andrei Iancu
*Director of the United States Patent and Trademark Office*